United States Patent [19]
Slepian et al.

[11] Patent Number: 5,954,781
[45] Date of Patent: Sep. 21, 1999

[54] METHOD AND APPARATUS FOR OPTIMIZING VEHICLE OPERATION

[75] Inventors: Harvey Slepian, Peoria; Loran Sutton, East Peoria, both of Ill.

[73] Assignee: TAS Distributing Co., Inc., Peoria, Ill.

[21] Appl. No.: 08/813,270

[22] Filed: Mar. 10, 1997

[51] Int. Cl.⁶ ................................................. G06F 7/00
[52] U.S. Cl. ..................... 701/96; 701/103; 340/425.5; 340/438
[58] Field of Search .................. 701/1, 121, 123, 701/101, 102, 103, 104, 96, 300; 123/478, 480, 351, 481; 340/903, 425.5, 426, 436, 438

[56] References Cited

U.S. PATENT DOCUMENTS

| | | | |
|---|---|---|---|
| 4,492,112 | 1/1985 | Igarashi et al. ........................ | 73/117.3 |
| 4,542,460 | 9/1985 | Weber ..................................... | 364/424 |
| 4,631,515 | 12/1986 | Blee et al. .............................. | 340/62 |
| 4,701,852 | 10/1987 | Ulveland ................................ | 364/424.1 |
| 4,752,883 | 6/1988 | Asakura et al. ........................ | 364/424.1 |
| 4,853,673 | 8/1989 | Kido et al. ............................. | 340/439 |
| 4,868,756 | 9/1989 | Kawanabe et al. .................... | 364/442 |
| 4,901,701 | 2/1990 | Chasteen ................................ | 123/478 |
| 5,420,792 | 5/1995 | Butsuen et al. ........................ | 701/96 |
| 5,708,584 | 1/1998 | Doi et al. ............................... | 701/96 |
| 5,745,870 | 4/1998 | Yamamoto et al. .................... | 701/96 |

*Primary Examiner*—William A. Cuchlinski, Jr.
*Assistant Examiner*—Gertrude Arthur
*Attorney, Agent, or Firm*—Haynes and Boone, LLP

[57] ABSTRACT

Apparatus for optimizing operation of an engine-driven vehicle. The apparatus includes a processor subsystem, a memory subsystem, a road speed sensor, an engine speed sensor, a manifold pressure sensor, a throttle position sensor, a radar detector for determining the distance separating the vehicle from an object in front of it, a windshield wiper sensor for indicating whether a windshield wiper of the vehicle is activated, a brake sensor for determining whether the brakes of the vehicle have been activated, a fuel over-injection notification circuit for issuing notifications that excessive fuel is being supplied to the engine of the vehicle, an upshift notification circuit for issuing notifications that the engine of the vehicle is being operated at an excessive engine speed, a downshift notification circuit for issuing notifications that the engine of the vehicle is being operated at an insufficient engine speed, a vehicle proximity alarm circuit for issuing an alarm that the vehicle is too close to an object in front of the vehicle and a throttle controller for automatically reducing the amount of fuel supplied to the engine if the vehicle is too close to the object in front of it. Based upon data received from the sensors and data stored in the memory subsystem, the processor determines whether to activate the fuel overinjection notification circuit, the upshift notification circuit, the downshift notification circuit, the vehicle proximity alarm circuit or the throttle controller.

32 Claims, 3 Drawing Sheets

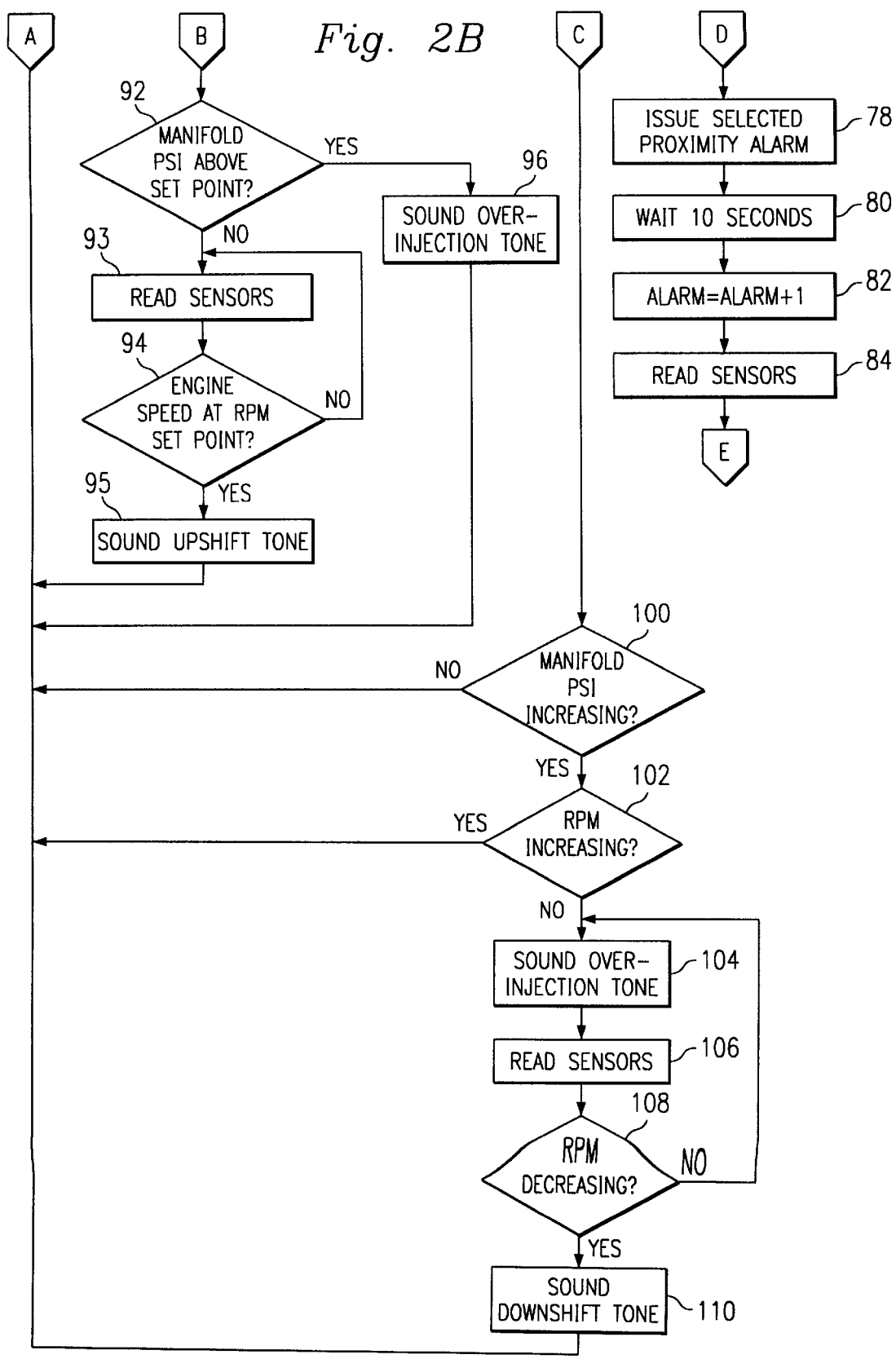

METHOD AND APPARATUS FOR OPTIMIZING VEHICLE OPERATION

BACKGROUND OF THE INVENTION

1. Field of the Invention

The present invention generally relates to an apparatus for optimizing vehicle operation and, more particularly, relates to a system which both notifies the driver of recommended corrections in vehicle operation and, under certain conditions, automatically initiates selected corrective action.

2. Description of Related Art

It has long been recognized that the improper operation of a vehicle may have many adverse effects. For example, the fuel efficiency of a vehicle may vary dramatically based upon how the vehicle is operated. More specifically, operating a vehicle at excessive speed, excessive RPM and/or excessive manifold pressure will result in both reduced fuel economy and increased operating costs. The aforementioned increased operating costs can be quite considerable, particularly for an owner or operator of a fleet of vehicles. To correct these types of improper vehicle operations are often surprisingly simple. For example, upshifting the drive gear will typically eliminate an excessive RPM condition. However, even when the solution is quite simple, oftentimes, the driver will be unaware of the need to take corrective action.

A variety of patents have disclosed systems, commonly referred to as "shift prompters", which monitor the operation of a vehicle and advises the operator of the vehicle when to take certain actions. Numerous ones of these devices include sensors which measure engine speed and vehicle speed. See, for example, U.S. Pat. No. 4,492,112 to Igarashi et al., U.S. Pat. No. 4,631,515 to Blee et al. and U.S. Pat. No. 4,701,852 to Ulveland. Certain ones, however, disclose the use of other types of sensors as well. For example, U.S. Pat. No. 4,524,460 to Weber is directed to a driving aid indicator which includes vehicle speed, manifold pressure, throttle position and engine speed sensors. U.S. Pat. No. 4,752,883 to Asakura et al. and U.S. Pat. No. 4,868,756 to Kawanabe et al. are directed to upshift notification devices which include sensors for measuring engine speed, vehicle speed, manifold pressure and cooling water temperature. Finally, U.S. Pat. No. 4,853,673 to Kido et al. discloses a shift indicator system which includes sensors for measuring engine speed and throttle position. Generally, the above-listed patents all provide displays intended to enable the driver to operate the vehicle in a manner leading to uniform performance and maximum fuel economy. However, Blee et al. discloses the use of audible warnings as well as a speed controller to prevent further increases in engine speed if the driver ignores previously issued warnings.

Improper vehicle operation has other adverse effects as well. It is well known that the faster a vehicle travels, the longer it takes to stop. Thus, what may be a safe separation distance between successive vehicles when a vehicle is traveling at 35 mph may be unsafe if that vehicle is traveling at 50 mph. Road conditions also play a role in determining the safe separation distance between vehicles. For example, greater separation distances are generally recommended when roads are wet. As a result, therefore, based on the combination of a vehicle's speed, the distance separating the vehicle from a second vehicle in front of it and road conditions, many vehicles are operated unsafely. To correct this situation, a reduction in operating speed, an increase in vehicle separation or some combination thereof, is required.

It may be readily seen from the foregoing that it would be desirable to provide a system which integrates the ability to issue audible warnings which advise the driver to correct operation of the vehicle in a manner which will enhance the efficient operation thereof with the ability to automatically take corrective action if the vehicle is being operated unsafely. It is, therefore, the object of the invention to provide such a system.

SUMMARY OF THE INVENTION

In one embodiment, the present invention is directed to an apparatus for optimizing operation of an engine-driven vehicle. The apparatus includes a processor subsystem, a memory subsystem, plural sensors, including road speed, manifold pressure and throttle position sensors, for collectively monitoring operation of the vehicle and a fuel overinjection notification circuit for issuing notifications that excessive fuel is being supplied to the engine of the vehicle. The processor subsystem receives data from the sensors and, from the received data, determines when to activate the fuel overinjection circuit. In one aspect thereof, the processor subsystem determines when road speed for the vehicle is increasing, determines when throttle position for the vehicle is increasing, compares manifold pressure and a manifold pressure set point stored in the memory subsystem and activates the fuel overinjection notification circuit if both road speed and throttle position for the vehicle are increasing and manifold pressure for the vehicle is above the manifold pressure set point.

In further aspects thereof, the sensors may include an engine speed sensor and the processor subsystem may determine when road speed for the vehicle is decreasing, when throttle position for the vehicle is increasing, when manifold pressure for the vehicle is increasing, when engine speed for the vehicle is decreasing and may activate the fuel overinjection notification circuit if both throttle position and manifold pressure for the vehicle are increasing and road speed and engine speed for the vehicle are decreasing.

In still further aspects thereof, the apparatus may also include an upshift notification circuit, activated by the processor subsystem based upon data received from the sensors, which issues notifications that the engine of the vehicle is being operated at excessive engine speeds. In this aspect, the processor subsystem determines when road speed for the vehicle is increasing, when throttle position for the vehicle is increasing, compares manifold pressure to a manifold pressure set point stored in the memory subsystem, compares engine speed to an RPM set point stored in the memory subsystem and activates the upshift notification circuit if both road speed and throttle position for the vehicle are increasing, manifold pressure for the vehicle is at or below the manifold pressure set point and engine speed for the vehicle is at or above the RPM set point.

In still yet further aspects thereof, the apparatus may also include a downshift notification circuit, activated by the processor subsystem based upon data received from the sensors, which issues a notification that the engine of the vehicle is being operated at an insufficient engine speed. The processor subsystem may determine when road speed for the vehicle is decreasing, when throttle position for the vehicle is increasing, when manifold pressure for the vehicle is increasing, when engine speed for the vehicle is decreasing and may activate the downshift notification circuit if both road speed and engine speed are decreasing and both throttle position and manifold pressure for the vehicle are increasing.

In still further aspects thereof, the fuel overinjection circuit, the upshift notification circuit or the downshift notification circuit may include a horn for issuing a tone for a preselected time period.

In another embodiment, the present invention is of an apparatus for optimizing operation of a vehicle. The apparatus includes road speed, engine speed, manifold pressure and throttle position sensors, a processor subsystem coupled to each of the sensors to receive data therefrom and a memory subsystem, coupled to the processor subsystem, for storing a manifold pressure set point, an engine speed set point and present and prior levels for each one of the sensors. The apparatus further includes a fuel overinjection notification circuit, an upshift notification circuit and a downshift notification circuit, all of which are coupled to the processor subsystem. The fuel overinjection notification circuit issues notifications that excessive fuel is being supplied to the engine of the vehicle, the upshift notification circuit issues notifications that the engine of the vehicle is being operated at an excessive engine speed and the downshift notification circuit issues notifications that the engine of the vehicle is being operated at an insufficient engine speed. Based upon data received from the sensors, the processor subsystem determines when to activate the fuel overinjection circuit, the upshift notification circuit and the downshift notification circuit. In one aspect thereof, the fuel overinjection circuit includes a first horn for issuing a first tone for a first preselected time period, the upshift notification circuit includes a second horn for issuing a second tone for a second preselected time period and the downshift notification circuit includes a third horn for issuing a third tone for a third preselected time period.

In another aspect thereof, the processor subsystem may determine when road speed for the vehicle is increasing or decreasing, engine speed is increasing or decreasing, throttle position for the vehicle is increasing and manifold pressure is increasing; may compare manifold pressure to the manifold pressure set point and engine speed to the RPM set point; and may activate the fuel overinjection notification circuit if both road speed and throttle position for the vehicle are increasing and manifold pressure for the vehicle is above the manifold pressure set point or if both throttle position and manifold pressure for the vehicle are increasing and road speed and engine speed for the vehicle are decreasing, the upshift notification circuit if both road speed and throttle position for the vehicle are increasing, manifold pressure for the vehicle is at or below the manifold pressure set point and engine speed for the vehicle is at or above the RPM set point and the downshift notification circuit if both road speed and engine speed are decreasing and both throttle position and manifold pressure for the vehicle are increasing.

In another aspect, the present invention is of an apparatus for optimizing operation of a vehicle which includes a radar detector for determining a distance separating a vehicle having an engine and an object in front of the vehicle and at least one sensor for monitoring operation of the vehicle. The apparatus further includes a processor subsystem, a memory subsystem and a vehicle proximity alarm circuit. The processor subsystem is coupled to the radar detector and the at least one sensor to receive data therefrom while the memory subsystem, in which a first vehicle speed/stopping distance table and present levels for each one of the at least one sensor are stored, and the vehicle proximity alarm circuit are coupled to the processor subsystem. Based on data received from the radar detector, the at least one sensor and the contents of the memory subsystem, the processor determines when to instruct the vehicle proximity alarm circuit to issue an alarm that the vehicle is too close to the object.

In one aspect thereof, the at least one sensor further includes a windshield wiper sensor for indicating whether a windshield wiper of the vehicle is activated and a second vehicle speed/stopping distance table is stored in the memory subsystem. In another aspect thereof, the apparatus further includes a throttle controller for controlling a throttle of the engine of the vehicle. The processor subsystem may selectively reduce the throttle based upon data received from the radar detector, the at least one sensor and the memory subsystem or may also count a total number of vehicle proximity alarms determined by the processor subsystem and selectively reduce the throttle based upon the total number of vehicle proximity alarms, as well. In yet another aspect thereof, the at least one sensor further includes a brake sensor for indicating whether a brake system of the vehicle is activated.

In other aspects thereof, the apparatus may be further provided with a fuel overinjection notification circuit for issuing a notification that excessive fuel is being supplied to the engine of the vehicle, an upshift notification circuit for issuing a notification that the engine of the vehicle is being operated at an excessive engine speed or a downshift notification circuit for issuing a notification that the engine of the vehicle is being operated at an insufficient engine speed. If a fuel overinjection notification circuit is provided, the apparatus includes a manifold pressure sensor and a throttle position sensor which also provide the processor subsystem with data used, together with a manifold pressure set point and prior levels for the sensors stored in the memory subsystem, to determine when to activate the fuel overinjection circuit. If an upshift notification circuit is provided, the apparatus includes an engine speed sensor which also provides the processor subsystem with data used, together with an RPM set point stored in the memory subsystem, to determine when to activate the upshift notification circuit. Finally, if a downshift notification circuit is provided, the processor subsystem determines when to activate the downshift notification circuit based upon the data received from the plurality of sensors.

In still another embodiment, the present invention is of an apparatus for optimizing operation of a vehicle which includes a radar detector for determining a distance separating the vehicle from an object in front of it, a plurality of sensors, including a road speed sensor, an engine speed sensor, a manifold pressure sensor and a throttle position sensor, which collectively monitor the operation of the vehicle, a processor subsystem, a memory subsystem, a fuel overinjection notification circuit for issuing notification that excessive fuel is being supplied to the engine of the vehicle and a vehicle proximity alarm circuit for issuing alarms if the vehicle is too close to the object. Based upon data received from the sensors, the processor subsystem determines when to activate the fuel overinjection circuit. Based upon data received from the radar detector, the sensors and the memory subsystem, the processor subsystem also determines when to activate the vehicle proximity alarm circuit.

In one aspect of this embodiment of the invention, the processor subsystem determines when road speed for the vehicle is increasing or decreasing, when throttle position for the vehicle is increasing or decreasing, compares manifold pressure to a manifold pressure set point stored in the memory subsystem, determines when manifold pressure for the vehicle is increasing or decreasing and determines when engine speed for the vehicle is increasing or decreasing. In this aspect, the processor subsystem activates the fuel overinjection notification circuit if both road speed and throttle position for the vehicle are increasing and manifold pressure for the vehicle is above the manifold pressure set point or if both throttle position and manifold pressure for the vehicle are increasing and road speed and engine speed for the vehicle are decreasing.

In a further aspect thereof, the apparatus may also include an upshift notification circuit for issuing notifications that the engine of the vehicle is being operated at an excessive engine speed, the processor subsystem determining when to activate the upshift notification circuit based upon data received from the sensors. In a related aspect thereof, the processor subsystem determines when road speed for the vehicle is increasing, determines when throttle position for the vehicle is increasing, compares manifold pressure to a manifold pressure set point stored in the memory subsystem and compares engine speed to an RPM set point stored in the memory subsystem. In this aspect, the processor subsystem activates the upshift notification circuit if both road speed and throttle position for the vehicle are increasing, manifold pressure for the vehicle is at or below the manifold pressure set point and engine speed for the vehicle is at or above the RPM set point.

In still another aspect thereof, the apparatus may also include a downshift notification circuit for issuing a notification that the engine of the vehicle is being operated at an insufficient engine speed. In this aspect, the processor subsystem determines when to activate the downshift notification circuit based upon data received from the sensors. In a related aspect thereof, the processor subsystem determines when road speed for the vehicle is decreasing, determines when throttle position for the vehicle is increasing, determines when manifold pressure for the vehicle is increasing and determines when engine speed for the vehicle is decreasing. In this aspect, the processor subsystem activates the downshift notification circuit if both road speed and engine speed are decreasing and both throttle position and manifold pressure for the vehicle are increasing.

BRIEF DESCRIPTION OF THE DRAWINGS

The present invention may be better understood, and its numerous objects, features and advantages will become apparent to those skilled in the art by reference to the accompanying drawing, in which:

FIGS. 2A–B is a flow chart of a method for optimizing vehicle performance in accordance with the teachings of the present invention.

DETAILED DESCRIPTION

Figure 1:
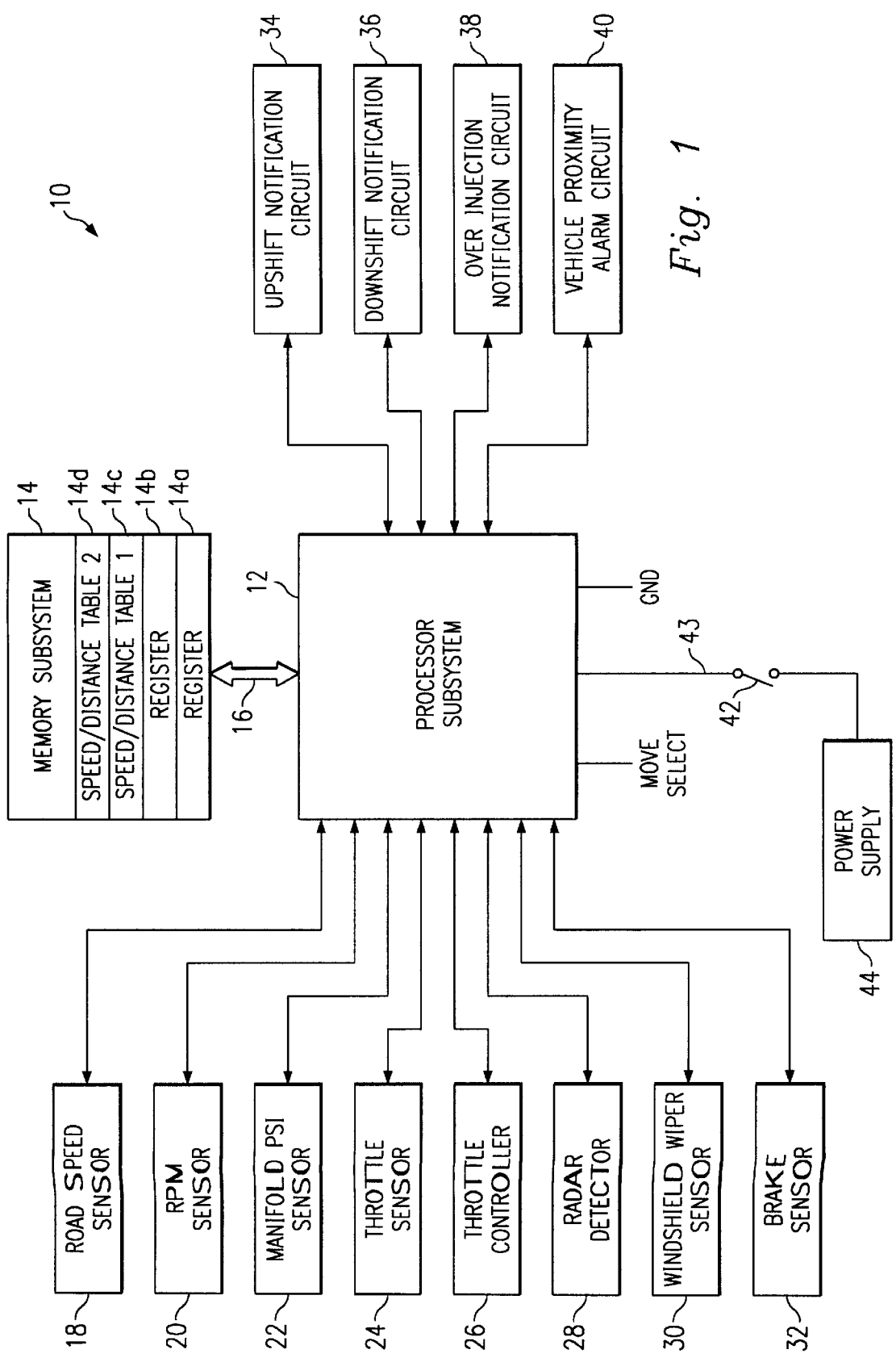
FIG. 1 is a block diagram of an apparatus for optimizing vehicle performance constructed in accordance with the teachings of the present invention.

Referring first to FIG. 1, a system 10 for optimizing vehicle performance constructed in accordance with the teachings of the present invention will now be described in greater detail. The system 10 includes a processor subsystem 12, for example, a microprocessor, and a memory subsystem 14, for example, the memory subsystem 14 may include a nonvolatile random access memory (or "NVRAM"), coupled together by a bus 16 for bi-directional exchanges of address, data and control signals therebetween. The system 10 is installed in a vehicle (not shown) for which optimized performance and driver assist capabilities are desired. Although it is contemplated that the system 10 is suitable for use with any type vehicle, most commonly, the system 10 shall be installed in a truck.

Also coupled to the processor subsystem 12 are a series of sensors, each of which are periodically polled by the processor subsystem 12, to determine the respective states or levels thereof. The sensors include a road speed sensor 18, an RPM sensor 20, a manifold pressure sensor 22, a throttle sensor 24, a windshield wiper sensor 30 and a brake sensor 32. The sensors are selected to be either state or level sensors, depending on whether the information to be collected thereby is a state, i.e., on/off or a level, for example, 35 mph. The road speed sensor 18 and the RPM sensor 20 are level sensors which respectively provide the processor subsystem 12 with signals which indicate the operating speed and engine speed for the vehicle. The road speed sensor 18 and the RPM sensor 20 may derive such information from any one of a variety of sources. For example, the road speed sensor 18 may be connected to receive the speed input signal transmitted to the vehicle's speedometer while the RPM sensor 20 may be connected to receive the RPM input signal to the vehicle's tachometer.

The manifold pressure sensor 22 is a level sensor which is positioned downstream of the throttle valve in the intake manifold of the vehicle to measure manifold pressure thereat. The throttle sensor 24 is a level sensor, attached to the throttle, which measures the extent to which the throttle is opened. The windshield wiper sensor 30 is a state sensor which determines whether the vehicle's windshield wipers are on or off. In alternate embodiments thereof, the windshield wiper sensor 30 may be electrically coupled to the on/off switch for the windshield wiper or to an output of the windshield wiper motor. Finally, the brake sensor 32 is a state sensor which determines whether the brakes of the vehicle have been engaged. For example, the brake sensor 32 may be electrically coupled to the brake system to detect the activation thereof.

Preferably, the memory subsystem 14 should include first and second registers 14a and 14b, each having sufficient bits for holding the state/level of each of the sensors 18, 20, 22, 24, 30 and 32. The first register 14a is used to hold the present state or level of each of the sensors 18, 20, 22, 24, 30 and 32 while the second register 14b is used to hold the prior state or level for each of the sensors 18, 20, 22, 24, 30 and 32. Each time the processor subsystem 12 writes the present state or level of the sensors 18, 20, 22, 24, 30 and 32 to the first register 14a, the prior contents of the first register 14a is written to the second register 14b which, in turn, discards the prior content thereof. The memory subsystem 14 is also used to hold information to be utilized by the processor subsystem 12 to determining whether to take corrective actions and/or issue notifications. Typically, such information is placed in the memory subsystem 14 while the system 10 is being initialized. The information includes one or more speed/distance tables which, when used in a manner which will be more fully described below in combination with data collected by the system 10, enable the processor subsystem 12 to determine if the vehicle is being operated unsafely and if corrective action is necessary. Speed/stopping distance table. The information also includes two pre-set threshold values—a manifold psi set point and an engine RPM set point. As will also be more fully described below, the processor subsystem 12 uses these threshold values to determine when to issue notifications as to recommended changes in vehicle operation which, when executed by the driver, will optimize vehicle operation. The speed/stopping distance table(s) are based upon National Safety Council guidelines, vary according to the class of the vehicle and provide the relationship between the speed at which a vehicle is travelling and the distance which the vehicle will require to come to a complete stop if travelling at that speed. The manifold psi set point and RPM set point are selected based upon the manufacturer's guidelines for proper operation of the vehicle, vary based upon horsepower and engine size for the vehicle and represent thresholds above which the manifold pressure and engine rotation speed, respectively, for the vehicle should never exceed.

The system 10 also includes a throttle controller 26 capable of opening and/or closing the throttle, a radar detector 28 positioned to determine the distance separating the vehicle and an object in front of the vehicle, for example, a second vehicle travelling in the same direction, a series of circuits 34, 36, 38 and 40 for notifying the driver of the vehicle of recommended corrections in vehicle operation and alerting the driver to unsafe operating conditions and a power supply, for example a +12 v battery, for providing power to the energy-demanding components of the system 10. The circuits 34, 36, 38 and 40 include an upshift notification circuit 34 for notifying the driver that an upshift is recommended, a downshift notification circuit 36 for notifying the driver that a downshift is recommended, an overinjection notification circuit 38 for notifying the driver that too much fuel is being supplied to the vehicle and a vehicle proximity alarm circuit 40 for alerting the driver when an object in front of the vehicle is too close. The circuits 34, 36 and 38 may be configured to provide visual and/or audible notifications, for example, using lights and/or horns. For example, the upshift circuit 34, the downshift notification circuit 36 and the overinjection notification circuit 38 may each include a horn, or other tone generating device, from which an audible notification may be generated at a selected pitch. Preferably, each of the notification circuits 34, 36 and 38 may be configured to provide distinct audible notifications, for example, tones at distinct pitches, so that the driver may readily distinguish which of the notification circuits 34, 36 and 38 have been activated by the processor subsystem 12. The proximity alarm circuit 40 may include one or more visual and/or audible warning devices such as lights and/or horns. For example, the proximity alarm circuit 40 may include a warning light and a warning horn. If desired, the proximity alarm circuit may also include a display for displaying the speed of the object in the vehicle's path and/or the stopping distance in feet. The proximity alarm circuit 40 may be further equipped to provide audible indications of the speed of the object in the vehicle's path and/or the stopping distance in feed as well as selector circuitry for selecting both the information to be provided as well as the manner in which the information is to be conveyed.

Finally, the processor subsystem 12 is further provided with one or more mode select input lines which enable operator configuration of the operation of the system 10. For example, as described herein, the corrective operations consist of the combination of an automatic reduction of throttle and audio/visual alerts that the vehicle is being operated unsafely. It is specifically contemplated, however, that the system 10 include a mode select line for switching the system 10 between an "active" mode where both automatic throttle reduction and audio/visual alerts are generated and an "inactive" mode where only audio/visual alerts are generated.

Figure 2A:
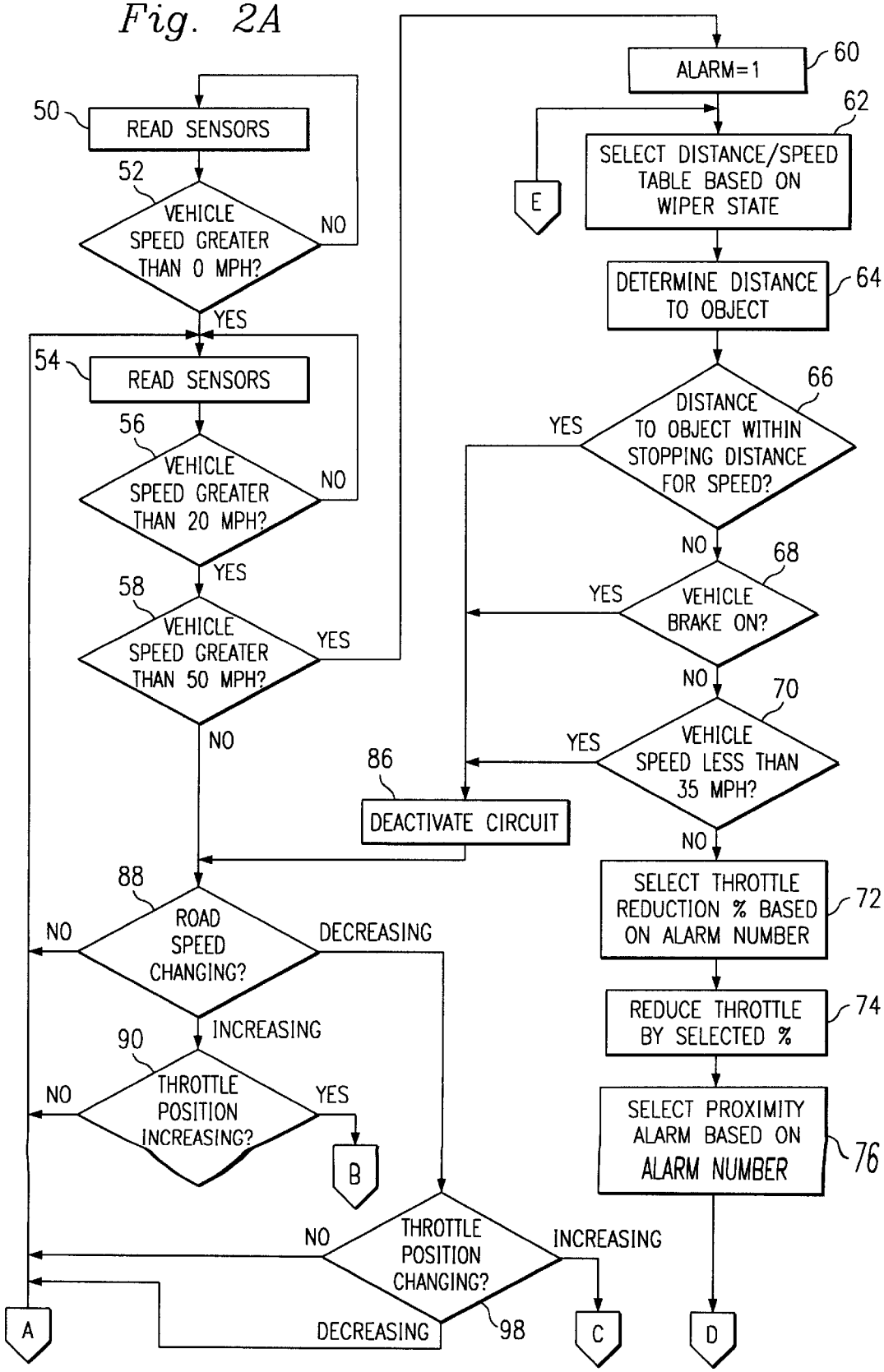

Referring next to FIGS. 2A–B, a method for optimizing vehicle performance in accordance with the teachings of the present invention will now be described in greater detail. The method commences by powering up the processor subsystem 12, for example, by closing switch 42, thereby coupling the processor subsystem 12 to the power source 44 via line 43. Alternately, the processor subsystem 12 may be connected to the electrical system of the vehicle such that it will automatically power up when the vehicle is started. Of course, any of the other devices which also form part of the system 10 and require power may also be coupled to the line 43. Appropriate voltage levels for the processor subsystem 12, as well as any additional power-demanding devices coupled to the power source 44, would be provided by voltage divider circuitry (not shown).

Once the system 10 is powered up, the method begins at step 50 by the processor subsystem 12 polling the road speed sensor 18, the RPM sensor 20, the manifold pressure sensor 22, the throttle sensor 24, the windshield wiper sensor 30 and the brake sensor 32 to determine their respective levels or states and places the acquired information in the first data register 14a. Of course, it should be noted, however, that polling of the sensors by the processor subsystem 12 is but one technique by which the processor subsystem 12 may acquire the requisite information. Alternately, each sensor 20, 22, 24, 30 and 32 may periodically place its level or state in one or more bits of the first data register 14a. The processor subsystem 12 would then acquire information by checking the contents of the first data register 14a at selected time intervals.

Proceeding to step 52, the processor subsystem 12 examines the contents of the first data register 14a to determine the operating speed of the vehicle. If the processor subsystem 12 determines that the vehicle is stationary, i.e., the operating speed of the vehicle is zero, the processor subsystem 12 will return to step 50 where the road speed sensor 18, the RPM sensor 20, the manifold pressure sensor 22, the throttle sensor 24, the windshield wiper sensor 30 and the brake sensor 32 will be repeatedly polled until an operating speed greater than zero is detected at step 52. While polling may be conducted at a variety of time intervals, a polling period of one second appears suitable for the uses contemplated herein.

Returning to step 52, once an operating speed greater than zero is detected by the processor subsystem 12, the method proceeds to step 54 where the processor subsystem 12 again polls the operating speed sensor 18, the RPM sensor 20, the manifold pressure sensor 22, the throttle sensor 24, the windshield wiper sensor 30 and the brake sensor 32, to determine their respective levels or states and places the acquired information in the first data register 14a. In turn, the contents of the first data register 14a is placed in the second data register 14b.

Proceeding now to step 56, from the polled value of the road speed sensor 18, the processor subsystem 12 determines whether the vehicle is travelling faster than 20 mph. If the operating speed of the vehicle is less than 20 mph, the method returns to step 54 where the sensors 18, 20, 22, 24, 30 and 32 will be repeatedly polled and the value of the road speed sensor examined until the processor subsystem 12 determines that the vehicle is travelling faster than 20 mph. If, however, the processor subsystem 12 determines that the vehicle is travelling faster than 20 mph, the method proceeds to step 58 where the processor subsystem 12 then determines if the vehicle is travelling faster than 50 mph, again by checking the contents of the first data register 14a.

Past this juncture, the method of the present invention will proceed through a series of steps designed to optimize vehicle operation. However, prior to optimizing vehicle operation, the processor subsystem 12 will determine if the vehicle is being operated unsafely. If so, the processor subsystem 12 will initiate corrective operations before commencing vehicle operation optimization. More specifically, if the processor subsystem 12 determines at step 58 that the vehicle is travelling at a speed greater than 50 mph, the processor subsystem 12 will initiate a process by which it will determine whether the vehicle is being operated unsafely.

The processor subsystem 12 determines that the vehicle is being operated unsafely if the speed of the vehicle is such that the stopping distance for the vehicle d is greater than the distance separating the vehicle from an object, for example, a second vehicle, in its path. In order to make this determination, the processor subsystem 12 is provided access to at least one speed/distance table. For example, stored at location 14c within the memory subsystem 14 is a first speed/stopping distance table. The speed/stopping distance table contains the relationship between vehicle speed and stopping distance. Thus, for any given speed, the processor subsystem 12 may look-up the stopping distance for that speed. Preferably, the memory subsystem 14 should contain multiple speed/stopping distance tables so that differences in road conditions and/or vehicle class may be taken into account. For example, the speed/stopping distance table stored at location 14c may be a speed/stopping distance table for dry roads while a speed/stopping distance table for wet roads may be stored at location 14d. If desired, the memory subsystem 14 may also contain additional speed/stopping distance tables for other vehicle classes. If such additional tables were provided, however, the disclosed method would need to be modified to include additional steps in which the operator provides the vehicle's class and the processor subsystem 12 selects the appropriate speed/stopping distance tables for the indicated class of vehicle.

To make the aforementioned determination of unsafe vehicle operation, the method proceeds to step 60 where the processor subsystem 12 sets the value of the expression ALARM to 1. The method then proceeds to step 62 where the processor subsystem 12 examines the state of the wiper sensor 32 and selects a speed/stopping distance table based upon the state of the wiper sensor 32. If the state of the wiper sensor 32 indicates that the windshield wiper is off, the processor subsystem 12 concludes that the vehicle is being operated in dry conditions and selects the speed/stopping distance table stored at the location 14c of the memory subsystem 14. If, however, the state of the wiper sensor 32 indicates that the windshield wiper is on, the processor subsystem 12 concludes that the vehicle is being operated in wet conditions and selects the speed/stopping distance table stored at the location 14d of the memory subsystem 14. From the selected speed/stopping distance table 14c or 14d, the processor subsystem 12 then retrieves the stopping distance for the speed at which the vehicle is travelling.

Continuing on to step 64, the processor subsystem 12 determines the distance of the vehicle to an object in its path, i.e., a second vehicle travelling in front of the vehicle and in the same direction. To do so, the processor subsystem 12 instructs the radar device 28 to determine the distance between the vehicle and the second vehicle in front of it. Upon determining the distance separating the two vehicles, the radar device 28 transmits the determined separation distance to the processor subsystem 12. At step 66, the processor subsystem 12 determines if the two vehicles are separated by a safe distance. To do so, the processor subsystem 12 compares the distance separating the two vehicles to the retrieved stopping distance for the vehicle. If the determined distance separating the two vehicles is greater than the retrieved stopping distance for the vehicle, the processor subsystem 12 determines that the vehicle is being operated safely. If, however, the determined distance separating the two vehicles is less than the retrieved stopping distance, the processor subsystem 12 determines that the vehicle is being operated unsafely.

If the processor subsystem 12 determines at step 66 that the vehicle is being operated unsafely, the processor subsystem 12 initiates appropriate corrective action. At step 68, the processor subsystem 12 determines whether the vehicle brake is on by examining the state of the brake sensor 32. If the brake is on, the processor subsystem 12 concludes that the driver is taking corrective action and that further corrective action is not necessary. If, however, the processor subsystem 12 determines that the vehicle brake is off, the method proceeds to step 70 where the processor subsystem examines the level of the vehicle speed sensor to determine if the speed of the vehicle is less than 35 mph. If the speed of the vehicle is less than 30 mph, the processor subsystem 12 concludes that no further corrective action will be taken.

If, however, the processor subsystem 12 determines that the speed of the vehicle is greater than 35 mph, the method proceeds to step 72 where the processor subsystem 12 selects a throttle reduction value based upon the value of the expression ALARM. Generally, the severity of the corrective action to be initiated by the processor subsystem 12 is varied depending on the number of times that corrective action has been taken and, more specifically, the severity of the selective corrective action increases with the value of the expression ALARM. For example, in the embodiment of the invention disclosed herein, if ALARM=1, a 25% throttle reduction is selected, if ALARM=2, a 50 throttle reduction is selected and, if ALARM$\geq$3, a 100% throttle reduction is selected. By reducing the throttle, the transport of fuel to the engine is retarded and the vehicle will begin to decelerate.

Continuing on to step 74, the processor subsystem 12 determines the extent to which the throttle is open using the throttle level provided by the throttle sensor 24 and, using throttle control 26, reduces the throttle by the selected percentage. At step 76, the processor subsystem 12 selects an alert mode, again based upon the value of the expression ALARM. As before, the severity of the alert mode may increase with the value of ALARM. For example, when ALARM=1, a warning light may be activated in a flash mode while, when 2$\leq$ALARM$\leq$3, an audible alert which lasts for a first selected time period, for example, two seconds, may be activated in combination with the flashing warning light and when ALARM$\geq$4, an audible alert which lasts for a second, longer, time period, for example, six seconds, may be activated in combination with the flashing light.

Proceeding to step 78, the processor subsystem 12 issues an alert to the operator of the vehicle in accordance with the selected alert mode. To do so, the processor subsystem 12 activates vehicle proximity alarm circuit 40 in accordance with the selected alert mode. After issuing the alert at step 78, the method proceeds to step 80 where the processor subsystem 12 waits a selected period before taking any further action. The wait period is intended to provide sufficient time to see if the previously initiated corrective action eliminates the hazardous condition. As disclosed herein, a wait period of 10 seconds is suitable. However, wait periods of various lengths should be equally suitable for the uses contemplated herein.

Upon expiration of the wait period, the value of the expression ALARM is incremented by one at step 82 and, at step 84, the processor subsystem 12 again polls the operating speed sensor 18, the RPM sensor 20, the manifold pressure sensor 22, the throttle sensor 24, the windshield wiper sensor 30 and the brake sensor 32, to determine their respective levels or states and places the acquired information in the first data register 14a. The method returns to step 64 where the distance between the vehicle and the object in its path is re-determined. The processor subsystem 12 continues to take corrective action until it determines that the vehicle is no longer being operated in a hazardous manner. More specifically, the processor subsystem 12 will conclude that the hazardous condition has been corrected when it either: determines at step 66 that the distance separating the vehicle and the object is within the stopping distance for the vehicle, determines at step 68 that the vehicle brake is on or determines at step 70 that the speed of the vehicle is less than 35 mph. Upon making such a determination, the method proceeds to step 86 where the processor subsystem 12 deactivated the vehicle proximity alarm circuit 40 to turn off the flashing light.

The method of optimizing vehicle operation in accordance with the teachings of the present invention will now be described in greater detail. Returning now to step 58, if the processor subsystem 12 determines that the vehicle is travelling slower than 50 mph, or if the processor subsystem 12 determines at step 66 that the distance separating the vehicle and the object is within the stopping distance for the vehicle or if the processor subsystem 12 determines at step 68 that the vehicle brake is on or if the processor subsystem 12 determines at step 70 that the speed of the vehicle is less than 35 mph, the method proceeds, after deactivation of the vehicle proximity alarm circuit 40, to step 88 where the processor subsystem 12 determines if the road speed of the vehicle is changing. To do so, the processor subsystem 12 compares the speed of the vehicle maintained in the first register 14a to the speed of the vehicle maintained in the second register 14b.

If the vehicle speed maintained in the first register 14a is greater than the vehicle speed maintained in the second register 14b, the vehicle is accelerating. If so, the method continues to step 90 where the processor subsystem 12 determines if the throttle position is increasing. To do so, the processor subsystem 12 compares the throttle level, i.e., the extent to which the throttled is opened, maintained in the first register 14a to the throttle level maintained in the second register 14b. If the throttle position has not increased, the processor subsystem 12 determines that, since the vehicle is accelerating but fuel consumption is not increasing, no modification of vehicle operation is necessary. Accordingly, the method returns to step 54 for a next polling of the sensors 18, 20, 22 24, 30 and 32.

If, however, the processor subsystem 12 determines at step 90 that the throttle position has increased, the method proceeds to step 92 where the processor subsystem 12 determines if the manifold pressure level maintained in the first register 14a has exceeded the manifold pressure set point for the vehicle. If the vehicle's road speed and throttle position are increasing and the manifold pressure for the vehicle is at or below the manifold pressure set point, the processor subsystem 12 proceeds to step 93 where the sensors 18, 20, 22, 24, 30 and 32 are again polled and on to step 94 where the processor subsystem 12 compares the engine speed level maintained in the first register 14a to the RPM set point stored in the memory subsystem 14 to determine if the engine speed has reached the RPM set point. If the engine speed has not reached the RPM set point, the method returns to step 93 where the sensors 18, 20, 22, 24, 30 and 32 are repeatedly polled until the processor subsystem 12 determines that the engine speed has reached the RPM set point. Once the engine speed has reached the RPM set point, the processor subsystem 12 determines that the vehicle needs to be upshifted and, proceeding to step 95, the processor subsystem 12 will activate the upshift notification circuit 34 to issue an audible alert for a selected time period, for example, 6 seconds, thereby notifying the driver that, in order to optimize vehicle operation, an upshift should be performed. The method then returns to step 54 for a next polling of the sensors 18, 20, 22 24, 30 and 32.

Returning to step 92, if the vehicle's road speed and throttle position are increasing and the manifold pressure for the vehicle is above the manifold pressure set point, the processor subsystem 12 determines that too much fuel is being provided to the engine and proceeding to step 96, the processor subsystem 12 will activate the overinjection notification circuit 38 to issue an audible alert for a selected time period, for example, 6 seconds, thereby notifying the driver that, in order to optimize vehicle operation, the amount of fuel being supplied to the engine should be reduced. The method then returns to step 54 for a next polling of the sensors 18, 20, 22 24, 30 and 32.

Returning to step 88, if the processor subsystem 12 determines, when comparing the speed of the vehicle maintained in the first register 14a to the speed of the vehicle maintained in the second register 14b, that the speed of the vehicle is decreasing, the method proceeds to step 98 where the processor subsystem 12 determines if the throttle position is changing. To do so, the processor subsystem 12 compares the throttle level, i.e., the extent to which the throttled is opened, maintained in the first register 14a to the throttle level maintained in the second register 14b. If the throttle position has either remained constant or decreased, the processor subsystem 12 determines that, since fuel consumption is either constant or reduced, no modification of vehicle operation is necessary. Accordingly, the method returns to step 54 for a next polling of the sensors 18, 20, 22 24, 30 and 32.

If, however, the processor subsystem 12 determines at step 98 that the throttle position has increased, the method proceeds to step 100 where the processor subsystem 12 determines if the manifold pressure is increasing. To do so, the processor subsystem 12 compares the manifold pressure level maintained in the first register 14a to the manifold pressure level maintained in the second register 14b. If the manifold pressure level maintained in the first register 14a is less than the manifold pressure level maintained in the second register 14b, the processor subsystem 12 determines that, since manifold pressure is decreasing, no modification of vehicle operation is necessary. Accordingly, the method returns to step 54 for a next polling of the sensors 18, 20, 22 24, 30 and 32.

If, however, the manifold pressure level maintained in the first register 14a is greater than the manifold pressure level maintained in the second register 14b, the processor subsystem 12 determines that the manifold pressure for the vehicle is increasing and the method proceeds to step 102 where the processor subsystem 12 determines if the engine speed is increasing. To do so, the processor subsystem 12 compares the engine speed level maintained in the first register 14a to the engine speed level maintained in the second register 14b. If the engine speed level maintained in the first register 14a is less than the engine speed level maintained in the second register 14b, the processor subsystem 12 determines that, since engine speed is increasing, no modification of vehicle operation is necessary. Accordingly, the method returns to step 54 for a next polling of the sensors 18, 20, 22 24, 30 and 32.

If, however, the engine speed level maintained in the first register 14a is less than the engine speed level maintained in the second register 14b, the processor subsystem 12 determines that, since the manifold pressure is increasing while the engine speed is decreasing, too much fuel is being supplied to the engine. Accordingly, at step 104, the processor subsystem 12 activates the overinjection notification circuit 38 to issue an audible alert for a selected time period, for example, 6 seconds, thereby notifying the driver that, in order to optimize vehicle operation, the amount of fuel being supplied to the engine should be reduced.

Proceeding on to step 106, the sensors 18, 20, 22 24, 30 and 32 are again polled and, at step 108, the processor subsystem 12 determines if the engine speed is decreasing, again by comparing the engine speed level maintained in the first and second registers 14a and 14b. If the engine speed has not decreased, the method returns to step 104 where the processor subsystem 12 again activates the overinjection notification circuit 38 to issue another audible alert notifying the driver that, in order to optimize vehicle operation, the amount of fuel being supplied to the engine should be reduced. Thus, the driver will be repeatedly notified of the overinjection condition until the processor subsystem 12 determines, at step 108, that the engine speed is decreasing. The method will then proceed to step 110 where, since the processor subsystem 12 has determined that, since the engine speed is decreasing, the vehicle should be downshifted. Accordingly, at step 110, the processor subsystem 12 activates the downshift notification circuit 36 to issue an audible alert for a selected time period, for example, 6 seconds, thereby notifying the driver that, in order to optimize vehicle operation, the vehicle should be downshifted. The method then returns to step 54 for a next polling of the sensors 18, 20, 22 24, 30 and 32. The method will repeatedly loop through the aforementioned process to continuously determine if the vehicle is being operated unsafely, take appropriate corrective action and to provide notifications to the driver as to how operation of the vehicle may be optimized until the processor subsystem 12 is powered down or the vehicle is turned off.

Thus, there has been described and illustrated herein, an apparatus for optimizing vehicle operation which combines both operator notifications of recommended corrections in vehicle operation with automatic modification of vehicle operation under certain circumstances. By incorporating the disclosed apparatus in a vehicle, not only will certain hazardous operations of the vehicle be prevented but also the driver will be advised of certain actions which will enable the vehicle to be operated with greater fuel efficiency. However, those skilled in the art will recognize that many modifications and variations besides those specifically mentioned herein may be made without departing substantially from the concept of the present invention. Accordingly, it should be clearly understood that the form of the invention described herein is exemplary only and is not intended as a limitation on the scope of the invention.

What is claimed is:

1. Apparatus for optimizing operation of a vehicle, comprising:
    a plurality of sensors coupled to a vehicle having an engine, said plurality of sensors, which collectively monitor operation of said vehicle, including a road speed sensor, an engine speed sensor, a manifold pressure sensor and a throttle position sensor;
    a processor subsystem, coupled to each one of said plurality of sensors, to receive data therefrom;
    a memory subsystem, coupled to said processor subsystem, said memory subsystem storing therein a manifold pressure set point, an RPM set point, and present and prior levels for each one of said plurality of sensors;
    a fuel overinjection notification circuit coupled to said processor subsystem, said fuel overinjection notification circuit issuing a notification that excessive fuel is being supplied to said engine of said vehicle;
    an upshift notification circuit coupled to said processor subsystem, said upshift notification circuit issuing a notification that said engine of said vehicle is being operated at an excessive speed;
    said processor subsystem determining, based upon data received from said plurality of sensors, when to activate said fuel overinjection circuit and when to activate said upshift notification circuit.

2. Apparatus for optimizing operation of a vehicle according to claim 1 wherein said processor subsystem further comprises:
    means for determining when road speed for said vehicle is increasing;
    means for determining when throttle position for said vehicle is increasing; and
    means for comparing manifold pressure to said manifold pressure set point;
    said processor subsystem activating said fuel overinjection notification circuit if both road speed and throttle position for said vehicle are increasing and manifold pressure for said vehicle is above said manifold pressure set point.

3. Apparatus for optimizing operation of a vehicle according to claim 1 wherein said fuel overinjection circuit further comprises a horn for issuing a tone for a preselected time period.

4. Apparatus for optimizing operation of a vehicle according to claim 1 wherein said processor subsystem further comprises:
    means for determining when road speed for said vehicle is decreasing;
    means for determining when throttle position for said vehicle is increasing;
    means for determining when manifold pressure for said vehicle is increasing; and
    means for determining when engine speed for said vehicle is decreasing;
    said processor subsystem activating said fuel overinjection notification circuit if both throttle position and manifold pressure for said vehicle are increasing and road speed and engine speed for said vehicle are decreasing.

5. Apparatus for optimizing operation of a vehicle according to claim 1 wherein said processor subsystem further comprises:
    means for determining when road speed for said vehicle is increasing;
    means for determining when throttle position for said vehicle is increasing;
    means for comparing manifold pressure to said manifold pressure set point; and
    means for comparing engine speed to said RPM set point;
    said processor subsystem activating said upshift notification circuit if both road speed and throttle position for said vehicle are increasing, manifold pressure for said vehicle is at or below said manifold pressure set point and engine speed for said vehicle is at or above said RPM set point.

6. Apparatus for optimizing operation of a vehicle according to claim 1 wherein said upshift notification circuit further comprises a horn for issuing a tone for a preselected time period.

7. Apparatus for optimizing operation of a vehicle, comprising:

a plurality of sensors coupled to a vehicle having an engine, said plurality of sensors, which collectively monitor operation of said vehicle, including a road speed sensor, a manifold pressure sensor and a throttle position sensor;

a processor subsystem, coupled to each one of said plurality of sensors, to receive data therefrom;

a memory subsystem, coupled to said processor subsystem, said memory subsystem storing therein a manifold pressure set point and present and prior levels for each one of said plurality of sensors;

a fuel overinjection notification circuit coupled to said processor subsystem, said fuel overinjection notification circuit issuing a notification that excessive fuel is being supplied to said engine of said vehicle;

a downshift notification circuit coupled to said processor subsystem, said downshift notification circuit issuing a notification that said engine of said vehicle is being operated at an insufficient engine speed; and said processor subsystem determining, based upon data received from said plurality of sensors, when to activate said fuel overinjection circuit and when to activate said downshift notification circuit.

8. Apparatus for optimizing operation of a vehicle according to claim 7 wherein said processor subsystem further comprises:

means for determining when road speed for said vehicle is increasing;

means for determining when throttle position for said vehicle is increasing; and means for comparing manifold pressure to said manifold pressure set point;

said processor subsystem activating said fuel overinjection notification circuit if both road speed and throttle position for said vehicle are increasing and manifold pressure for said vehicle is above said manifold pressure set point.

9. Apparatus for optimizing operation of a vehicle according to claim 7 wherein said fuel overinjection circuit further comprises a horn for issuing a tone for a preselected time period.

10. Apparatus for optimizing operation of a vehicle according to claim 7 wherein said processor subsystem further comprises:

means for determining when road speed for said vehicle is decreasing;

means for determining when throttle position for said vehicle is increasing;

means for determining when manifold pressure for said vehicle is increasing; and means for determining when engine speed for said vehicle is decreasing;

said processor subsystem activating said downshift notification circuit if both road speed and engine speed are decreasing and both throttle position and manifold pressure for said vehicle are increasing.

11. Apparatus for optimizing operation of a vehicle according to claim 10 wherein said downshift notification circuit further comprises a horn for issuing a tone for a preselected time period.

12. Apparatus for optimizing operation of a vehicle according to claim 7 wherein said processor subsystem further comprises:

means for determining when road speed for said vehicle is decreasing;

means for determining when throttle position for said vehicle is increasing;

means for determining when manifold pressure for said vehicle is increasing; and means for determining when engine speed for said vehicle is decreasing;

said processor subsystem activating said fuel overinjection notification circuit if both throttle position and manifold pressure for said vehicle are increasing and road speed and engine speed for said vehicle are decreasing.

13. Apparatus for optimizing operation of a vehicle, comprising:

a plurality of sensors coupled to a vehicle having an engine, said plurality of sensors, which collectively monitor operation of said vehicle, including a road speed sensor, an engine speed sensor, a manifold pressure sensor and a throttle position sensor;

a processor subsystem, coupled to each one of said plurality of sensors, to receive data therefrom;

a memory subsystem, coupled to said processor subsystem, said memory subsystem storing therein a manifold pressure set point, an engine speed set point and present and prior levels for each one of said plurality of sensors;

a fuel overinjection notification circuit coupled to said processor subsystem, said fuel overinjection notification circuit issuing a notification that excessive fuel is being supplied to said engine of said vehicle;

an upshift notification circuit coupled to said processor subsystem, said upshift notification circuit issuing a notification that said engine of said vehicle is being operated at an excessive engine speed;

a downshift notification circuit coupled to said processor subsystem, said downshift notification circuit issuing a notification that said engine of said vehicle is being operated at an insufficient engine speed;

said processor subsystem determining, based upon data received from said plurality of sensors, when to activate said fuel overinjection circuit, said upshift notification circuit and said downshift notification circuit.

14. Apparatus for optimizing operation of a vehicle according to claim 13 wherein:

said fuel overinjection circuit further comprises a first horn for issuing a first tone for a first preselected time period;

said upshift notification circuit further comprises a second horn for issuing a second tone for a second preselected time period; and said downshift notification circuit further comprises a third horn for issuing a third tone for a third preselected time period.

15. Apparatus for optimizing vehicle performance according to claim 13 wherein said processor subsystem further comprises:

means for determining when road speed for said vehicle is increasing or decreasing means for determining when throttle position for said vehicle is increasing;

means for comparing manifold pressure to said manifold pressure set point;

means for comparing engine speed to said RPM set point;

means for determining when manifold pressure is increasing; and means for determining when engine speed is increasing or decreasing;

said processor subsystem activating said fuel overinjection notification circuit if both road speed and throttle position for said vehicle are increasing and manifold pressure for said vehicle is above said manifold pressure set or if both throttle position and manifold pressure for said vehicle are increasing and road speed and engine speed for said vehicle are decreasing;

said processor subsystem activating said upshift notification circuit if both road speed and throttle position for said vehicle are increasing, manifold pressure for said vehicle is at or below said manifold pressure set point and engine speed for said vehicle is at or above said RPM set point; and said processor subsystem activating said downshift notification circuit if both road speed and engine speed are decreasing and both throttle position and manifold pressure for said vehicle are increasing.

16. Apparatus for optimizing operation of a vehicle according to claim 15 wherein:

said fuel overinjection circuit further comprises a first horn for issuing a first tone for a first preselected time period;

said upshift notification circuit further comprises a second horn for issuing a second tone for a second preselected time period; and said downshift notification circuit further comprises a third horn for issuing a third tone for a third preselected time period.

17. Apparatus for optimizing operation of a vehicle, comprising:

a radar detector, said radar detector determining a distance separating a vehicle having an engine and an object in front of said vehicle;

at least one sensor coupled to said vehicle for monitoring operation thereof, said at least one sensor including a road speed sensor, a manifold pressure sensor, a throttle position sensor and an engine speed sensor;

a processor subsystem, coupled to said radar detector and said at least one sensor, to receive data therefrom;

a memory subsystem, coupled to said processor subsystem, said memory subsystem storing a first vehicle speed/stopping distance table, a manifold pressure set point, an RPM set point, a present level for each one of said at least one sensor and a prior level for each one of said at least one sensor;

a vehicle proximity alarm circuit coupled to said processor subsystem, said vehicle proximity alarm circuit issuing an alarm that said vehicle is too close to said object;

a fuel overinjection circuit coupled to said processor subsystem, said fuel overinjection circuit issuing a notification that excessive fuel is being supplied to said engine of said vehicle;

an upshift notification circuit coupled to said processor subsystem, said upshift notification circuit issuing a notification that said engine of said vehicle is being operated at an excessive speed;

said processor subsystem determining, based upon data received from said radar detector, said at least one sensor and said memory subsystem, when to activate said vehicle proximity alarm circuit, when to activate said fuel overinjection circuit, and when to activate said upshift notification circuit.

18. Apparatus for optimizing operation of a vehicle according to claim 17 wherein:

said at least one sensor further includes a windshield wiper sensor for indicating whether a windshield wiper of said vehicle is activated; and said memory subsystem further storing a second vehicle speed/stopping distance table.

19. Apparatus for optimizing operation of a vehicle according to claim 17 and further comprising:

a throttle controller for controlling a throttle of said engine of said vehicle; and said processor subsystem selectively reducing said throttle based upon data received from said radar detector, said at least one sensor and said memory subsystem.

20. Apparatus for optimizing operation of a vehicle according to claim 19 wherein said at least one sensor further includes a brake sensor for indicating whether a brake system of said vehicle is activated.

21. Apparatus for optimizing operation of a vehicle according to claim 19 wherein said processor subsystem further comprises:

means for counting a total number of vehicle proximity alarms determined by said processor subsystem;

means for selectively reducing said throttle based upon said total number of vehicle proximity alarms.

22. Apparatus for optimizing operation of a vehicle according to claim 17 and further comprising:

a downshift notification circuit coupled to said processor subsystem, said downshift notification circuit issuing a notification that said engine of said vehicle is being operated at an insufficient engine speed; and said processor subsystem determining, based upon data received from said plurality of sensors, when to activate said downshift notification circuit.

23. Apparatus for optimizing operation of a vehicle, comprising:

a radar detector, said radar detector determining a distance separating a vehicle having an engine and an object in front of said vehicle;

a plurality of sensors coupled to a vehicle having an engine, said plurality of sensors, which collectively monitor operation of said vehicle, including a road speed sensor, and engine speed sensor, a manifold pressure sensor and a throttle position sensor;

a processor subsystem, coupled to said radar detector and each one of said plurality of sensors, to receive data therefrom;

a memory subsystem, coupled to said processor subsystem, said memory subsystem storing therein a first vehicle speed/stopping distance table, a manifold pressure set point, an RPM set point, and present and prior levels for each one of said plurality of sensors;

a fuel overinjection notification circuit coupled to said processor subsystem, said fuel overinjection notification circuit issuing a notification that excessive fuel is being supplied to said engine of said vehicle;

an upshift notification circuit coupled to said processor subsystem, said upshift notification circuit issuing a notification that said engine of said vehicle is being operated at an excessive engine speed;

said processor subsystem determining, based upon data received from said plurality of sensors, when to activate said fuel overinjection circuit and when to activate said upshift notification circuit;

a vehicle proximity alarm circuit coupled to said processor subsystem, said vehicle proximity alarm circuit issuing an alarm that said vehicle is too close to said object;

said processor subsystem determining, based upon data received from said radar detector, said at least one sensor and said memory subsystem, when to activate said vehicle proximity alarm circuit.

24. Apparatus for optimizing operation of a vehicle according to claim 23 wherein said processor subsystem further comprises:

means for determining when road speed for said vehicle is increasing or decreasing;

means for determining when throttle position for said vehicle is increasing or decreasing; and means for comparing manifold pressure to said manifold pressure set point;

means for determining when manifold pressure for said vehicle is increasing or decreasing; and means for determining when engine speed for said vehicle is increasing or decreasing;

said processor subsystem activating said fuel overinjection notification circuit if both road speed and throttle position for said vehicle are increasing and manifold pressure for said vehicle is above said manifold pressure set point or if both throttle position and manifold pressure for said vehicle are increasing and road speed and engine speed for said vehicle are decreasing.

25. Apparatus for optimizing operation of a vehicle according to claim 23 wherein said processor subsystem further comprises:

means for determining when road speed for said vehicle is increasing;

means for determining when throttle position for said vehicle is increasing;

means for comparing manifold pressure to said manifold pressure set point; and means for comparing engine speed to said RPM set point;

said processor subsystem activating said upshift notification circuit if both road speed and throttle position for said vehicle are increasing, manifold pressure for said vehicle is at or below said manifold pressure set point and engine speed for said vehicle is at or above said RPM set point.

26. Apparatus for optimizing operation of a vehicle, comprising:

a radar detector, said radar detector determining a distance separating a vehicle having an engine and an object in front of said vehicle;

a plurality of sensors coupled to a vehicle having an engine, said plurality of sensors, which collectively monitor operation of said vehicle, including a road speed sensor, and engine speed sensor, a manifold pressure sensor and a throttle position sensor;

a processor subsystem, coupled to said radar detector and each one of said plurality of sensors, to receive data therefrom;

a memory subsystem, coupled to said processor subsystem, said memory subsystem storing therein a first vehicle speed/stopping distance table, a manifold pressure set point, RPM set point, and present and prior levels for each one of said plurality of sensors;

a fuel overinjection notification circuit coupled to said processor subsystem, said fuel overinjection notification circuit issuing a notification that excessive fuel is being supplied to said engine of said vehicle;

a downshift notification circuit coupled to said processor subsystem, said downshift notification circuit issuing a notification that said engine of said vehicle is being operated at an insufficient engine speed;

said processor subsystem determining, based upon data received from said plurality of sensors, when to activate said fuel overinjection circuit and when to activate said downshift notification circuit;

a vehicle proximity alarm circuit coupled to said processor subsystem, said vehicle proximity alarm circuit issuing an alarm that said vehicle is too close to said object;

said processor subsystem determining, based upon data received from said radar detector, said at least one sensor and said memory subsystem, when to activate said vehicle proximity alarm circuit.

27. Apparatus for optimizing operation of a vehicle according to claim 26 wherein said processor subsystem further comprises:

means for determining when road speed for said vehicle is decreasing;

means for determining when throttle position for said vehicle is increasing;

means for determining when manifold pressure for said vehicle is increasing; and means for determining when engine speed for said vehicle is decreasing;

said processor subsystem activating said downshift notification circuit if both road speed and engine speed are decreasing and both throttle position and manifold pressure for said vehicle are increasing.

28. Apparatus for optimizing operation of a vehicle, comprising:

a plurality of sensors coupled to a vehicle having an engine, said plurality of sensors, which collectively monitor operation of said vehicle, including a road speed sensor, a manifold pressure sensor and a throttle position sensor;

a processor subsystem, coupled to each one of said plurality of sensors, to receive data therefrom;

a fuel overinjection notification circuit coupled to said processor subsystem, said fuel overinjection notification circuit issuing a notification that excessive fuel is being supplied to said engine of said vehicle;

said processor subsystem determining whether to activate said fuel overinjection notification sensor based upon data received from said road speed sensor, said throttle position sensor and said manifold pressure sensor.

29. Apparatus according to claim 28 and further comprising:

a memory subsystem, coupled to said processor subsystem, said memory subsystem maintaining a manifold pressure set point;

said processor subsystem activating said fuel overinjection notification circuit upon determining that:
  (1) based upon data received from said road speed sensor, road speed of said vehicle is increasing;
  (2) based upon data received from said throttle position sensor, throttle position for said vehicle is increasing; and (3) based upon data received from said manifold pressure sensor, manifold pressure for said vehicle exceeds said manifold pressure set point.

30. Apparatus according to claim 28, wherein:

said plurality of sensors coupled to said vehicle further include an engine speed sensor;

said processor subsystem activating said fuel overinjection notification circuit upon determining that:
  (1) based upon data received from said road speed sensor, road speed of said vehicle is decreasing;
  (2) based upon data received from said throttle position sensor, throttle position for said vehicle is increasing;
  (3) based upon data received from said manifold pressure sensor, manifold pressure for said vehicle is increasing; and
  (4) based upon data received from said engine speed sensor, engine speed for said vehicle is decreasing.

31. Apparatus for optimizing operation of a vehicle, comprising:

a radar detector, said radar detector determining a distance separating a vehicle having an engine and an object in front of said vehicle;

at least one sensor coupled to said vehicle for monitoring operation thereof, said at least one sensor including a road speed sensor;

a processor subsystem, coupled to said radar detector and said at least one sensor, to receive data therefrom;

a memory subsystem, coupled to said processor subsystem, said memory subsystem storing a first vehicle speed/stopping distance table;

a vehicle proximity alarm circuit coupled to said processor subsystem, said vehicle proximity alarm circuit issuing an alarm that said vehicle is too close to said object;

said processor subsystem determining whether to activate said vehicle proximity alarm circuit based upon separation distance data received from said radar detector, vehicle speed data received from said road speed sensor and said first vehicle speed/stopping distance table stored in said memory subsystem.

32. Apparatus for optimizing operation of a vehicle according to claim 31 wherein:

said at least one sensor further includes a windshield wiper sensor for indicating whether a windshield wiper of said vehicle is activated; and said memory subsystem further storing a second vehicle speed/stopping distance table;

if said windshield wiper sensor indicates that said windshield wiper is deactivated, said processor subsystem determining whether to activate said vehicle proximity alarm circuit based upon data received from said radar detector, said road speed sensor and said first vehicle speed/stopping distance table stored in said memory subsystem;

if said windshield wiper sensor indicates that said windshield wiper is activated, said processor subsystem determining whether to activate said vehicle proximity alarm circuit based upon data received from said radar detector, said road speed sensor and said second vehicle speed/stopping distance table stored in said memory subsystem.

* * * * *

Disclaimer

5,954,781—Harvey Slepian, Peoria, IL (US); Loran Sutton, East Peoria, IL (US). METHOD AND APPARATUS FOR OPTIMIZING VEHICLE OPERATION. Patent dated September 21, 1999. Disclaimer filed December 10, 2014, by the inventors.

Hereby disclaim complete claims 31 and 32, of said patent.
*(Official Gazette, February 24, 2015)*

US005954781C1

(12) EX PARTE REEXAMINATION CERTIFICATE (10647th)
United States Patent
Slepian et al.

(10) Number: US 5,954,781 C1
(45) Certificate Issued: Jul. 7, 2015

(54) METHOD AND APPARATUS FOR OPTIMIZING VEHICLE OPERATION

(75) Inventors: Harvey Slepian, Peoria, IL (US); Loran Sutton, East Peoria, IL (US)

(73) Assignee: VELOCITY PATENT LLC, Atherton, CA (US)

Reexamination Request:
No. 90/013,252, May 22, 2014

Reexamination Certificate for:
Patent No.: 5,954,781
Issued: Sep. 21, 1999
Appl. No.: 08/813,270
Filed: Mar. 10, 1997

Disclaimer of Claims 31 and 32
Filed: Dec. 10, 2014 (1411 O.G. 243)

(51) Int. Cl.
G06F 7/00 (2006.01)
B60R 16/023 (2006.01)

(52) U.S. Cl.
CPC .... *B60R 16/0231* (2013.01); *B60W 2510/0671* (2013.01)

(58) Field of Classification Search
None
See application file for complete search history.

(56) References Cited

To view the complete listing of prior art documents cited during the proceeding for Reexamination Control Number 90/013,252, please refer to the USPTO's public Patent Application Information Retrieval (PAIR) system under the Display References tab.

Primary Examiner — David England

(57) ABSTRACT

Apparatus for optimizing operation of an engine-driven vehicle. The apparatus includes a processor subsystem, a memory subsystem, a road speed sensor, an engine speed sensor, a manifold pressure sensor, a throttle position sensor, a radar detector for determining the distance separating the vehicle from an object in front of it, a windshield wiper sensor for indicating whether a windshield wiper of the vehicle is activated, a brake sensor for determining whether the brakes of the vehicle have been activated, a fuel overinjection notification circuit for issuing notifications that excessive fuel is being supplied to the engine of the vehicle, an upshift notification circuit for issuing notifications that the engine of the vehicle is being operated at an excessive engine speed, a downshift notification circuit for issuing notifications that the engine of the vehicle is being operated at an insufficient engine speed, a vehicle proximity alarm circuit for issuing an alarm that the vehicle is too close to an object in front of the vehicle and a throttle controller for automatically reducing the amount of fuel supplied to the engine if the vehicle is too close to the object in front of it. Based upon data received from the sensors and data stored in the memory subsystem, the processor determines whether to activate the fuel overinjection notification circuit, the upshift notification circuit, the downshift notification circuit, the vehicle proximity alarm circuit or the throttle controller.

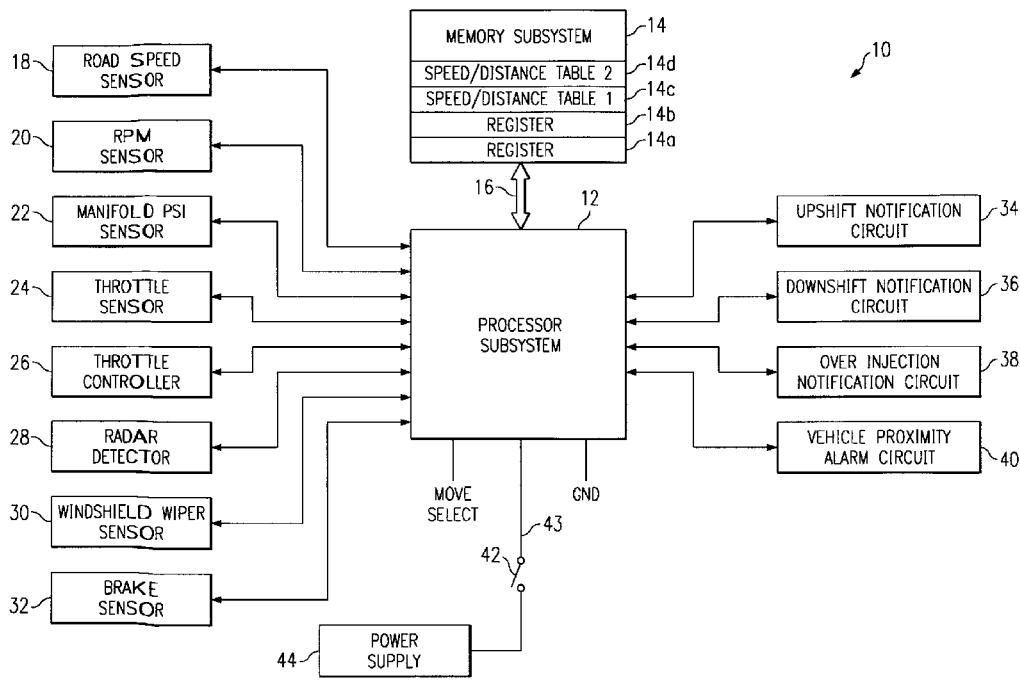

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 4, 5, 7, 8, 10, 12, 13, 15 and 17-30 is confirmed.

Claims 31 and 32 are now disclaimed.

New claims 33-89 are added and determined to be patentable.

Claims 3, 6, 9, 11, 14 and 16 were not reexamined.

33. *Apparatus for optimizing operation of a vehicle according to claim 1 further comprising:*
   *means for determining a distance separating a vehicle and an object, wherein the vehicle includes an engine; and*
   *a vehicle proximity alarm circuit coupled to said processor subsystem, wherein the vehicle proximity alarm circuit includes at least one of a visual notification and an audible notification;*
   *wherein, upon the processor subsystem receiving the distance from said means for determining a distance and determining said distance is less than a predetermined distance, the processor subsystem activates the vehicle proximity alarm circuit.*

34. *Apparatus for optimizing operation of a vehicle according to claim 33, further comprising:*
   *a throttle controller for controlling a throttle of said engine of said vehicle;*
   *wherein, upon the processor subsystem receiving the distance from said means for determining a distance and determining said distance received is less than a predetermined distance, the processor subsystem reduces said throttle.*

35. *Apparatus for optimizing operation of a vehicle according to claim 34, wherein the processor subsystem includes (i) an active mode wherein the processor subsystem activates an alarm and reduces the throttle based upon the distance received from said means for determining, and (ii) an inactive mode wherein the processor subsystem activates an alarm and the processor subsystem does not reduce the throttle based upon the distance received from said means for determining.*

36. *Apparatus for optimizing operation of a vehicle according to claim 35, further comprising a mode select line for switching between said active mode and said inactive mode.*

37. *Apparatus for optimizing operation of a vehicle according to claim 33, further wherein the processor subsystem determines whether the brakes of the vehicle are activated.*

38. *Apparatus for optimizing operation of a vehicle according to claim 33, wherein the vehicle proximity alarm circuit further comprises a display for displaying at least one of the speed of the object, and the distance to the object.*

39. *Apparatus for optimizing operation of a vehicle according to claim 1, wherein said plurality of sensors is the engine speed sensor and the vehicle speed sensor.*

40. *Apparatus for optimizing operation of a vehicle according to claim 1, wherein said notification that the engine is being operated an excessive speed comprises an automatic corrective action by the vehicle.*

41. *Apparatus for optimizing operation of a vehicle according to claim 1, wherein said notification that the engine is being operated at an excessive speed notifies a driver that an upshift should be performed.*

42. *Apparatus for optimizing operation of a vehicle according to claim 1, wherein said notification that excessive fuel is being supplied to said engine of said vehicle notifies a driver that the vehicle is not being operated fuel efficiently.*

43. *Apparatus for optimizing operation of a vehicle according to claim 1, wherein said manifold pressure set point is a manifold pressure threshold value.*

44. *Apparatus for optimizing operation of a vehicle according to claim 1, wherein said manifold pressure set point is a threshold value above which the manifold pressure should not exceed.*

45. *Apparatus for optimizing operation of a vehicle according to claim 1, wherein said processor subsystem determines when to activate said fuel overinjection circuit and said upshift notification circuit based upon said manifold pressure set point and said RPM set point.*

46. *Apparatus for optimizing operation of a vehicle according to claim 1, wherein said determination to activate said fuel overinjection circuit is based on data from the road speed sensor.*

47. *Apparatus for optimizing operation of a vehicle according to claim 1, wherein said determination to activate said fuel overinjection circuit is based on data from the manifold pressure sensor.*

48. *Apparatus for optimizing operation of a vehicle according to claim 1, wherein said determination to activate said fuel overinjection circuit is based on data from the throttle position sensor.*

49. *Apparatus for optimizing operation of a vehicle according to claim 1, wherein said processor subsystem is configured to automatically power on when the vehicle is started.*

50. *Apparatus for optimizing operation of a vehicle according to claim 1, wherein said determination when to activate said fuel overinjection circuit and said determination when to activate said upshift notification circuit is based upon said present and prior levels for said plurality of sensors stored in said memory subsystem.*

51. *Apparatus for optimizing operation of a vehicle according to claim 1, wherein said processor subsystem is configured to periodically communicate with said plurality of sensors.*

52. *Apparatus for optimizing operation of a vehicle according to claim 1, wherein said processor subsystem is configured to retrieve data from the plurality of sensors and store the data in said memory subsystem.*

53. *Apparatus for optimizing operation of a vehicle according to claim 17, wherein the processor subsystem includes (i) an active mode wherein the processor subsystem activates an alarm and reduces the throttle based upon a distance received from said radar detector, and (ii) an inactive mode wherein the processor subsystem activates an alarm and the processor subsystem does not reduce the throttle based upon a distance received from said radar detector.*

54. *Apparatus for optimizing operation of a vehicle according to claim 53, further comprising a mode select line for switching between said active mode and said inactive mode.*

55. Apparatus for optimizing operation of a vehicle according to claim 17, wherein said processor subsystem activates said upshift notification circuit based on the manifold pressure set point and RPM set point.

56. Apparatus for optimizing operation of a vehicle according to claim 17, wherein said at least one sensor is the road speed sensor.

57. Apparatus for optimizing operation of a vehicle according to claim 17, wherein the first speed/stopping distance table is based on National Safety Council guidelines.

58. Apparatus for optimizing operation of a vehicle according to claim 17, further wherein said processor subsystem automatically applies the brakes based upon data received from said radar detector, said at least one sensor and said memory subsystem.

59. Apparatus for optimizing operation of a vehicle according to claim 28 further comprising:
  a means for determining a distance separating a vehicle and an object, wherein the vehicle includes an engine; and
  a vehicle proximity alarm circuit coupled to said processor subsystem;
  wherein said processor subsystem activates said vehicle proximity alarm circuit based at least upon the data received from said road speed sensor, and the means for determining the distance separating the vehicle and the object.

60. Apparatus for optimizing operation of a vehicle, comprising:
  a radar detector, said radar detector determining a distance separating a vehicle having an engine and an object in front of said vehicle;
  a plurality of sensors coupled to said vehicle for monitoring operation thereof, said plurality of sensors including a road speed sensor and an engine speed sensor;
  a processor subsystem, coupled to said radar detector and said at least one sensor, to receive data therefrom;
  a memory subsystem, coupled to said processor subsystem, said memory subsystem storing a first vehicle speed/stopping distance table;
  a vehicle proximity alarm circuit coupled to said processor subsystem, said vehicle proximity alarm circuit issuing an alarm that said vehicle is too close to said object;
  said processor subsystem determining whether to activate said vehicle proximity alarm circuit based upon separation distance data received from said radar detector, vehicle speed data received from said road speed sensor and said first vehicle speed/stopping distance table stored in said memory subsystem; and
  a throttle controller for controlling a throttle of said engine of said vehicle;
  wherein said processor subsystem selectively reduces said throttle based upon the data received from said radar detector;
  further wherein the processor subsystem includes (i) an active mode in which the processor subsystem activates the vehicle proximity alarm circuit to issue the vehicle proximity alarm and reduces the throttle based upon the data received from said radar detector, and (ii) an inactive mode in which the processor subsystem activates the vehicle proximity alarm circuit to issue the alarm and the throttle is not selectively reduced based upon the data received from said radar detector;
  a fuel overinjection notification circuit coupled to said processor subsystem, said fuel overinjection notification circuit issuing a notification that excessive fuel is being supplied to said engine of said vehicle;
  wherein said processor subsystem determines whether to activate said fuel overinjection notification circuit based upon at least the data received from said road speed sensor.

61. Apparatus for optimizing operation of a vehicle according to claim 60, wherein said first speed/stopping distance table is a lookup table.

62. Apparatus for optimizing operation of a vehicle according to claim 60, wherein said first speed/stopping distance table is based upon National Safety Council guidelines.

63. Apparatus for optimizing operation of a vehicle according to claim 60, wherein said vehicle comprises a truck.

64. Apparatus for optimizing operation of a vehicle according to claim 60, wherein said memory subsystem stores vehicle class information.

65. Apparatus for optimizing operation of a vehicle according to claim 60, wherein said processor subsystem is configured to automatically power on when the vehicle is started.

66. Apparatus for optimizing operation of a vehicle according to claim 60, wherein said first speed/stopping distance table is the relationship between vehicle speed and stopping distance.

67. Apparatus for optimizing operation of a vehicle according to claim 60 wherein:
  said plurality of sensors further including a windshield wiper sensor for indicating whether a windshield wiper of said vehicle is activated; and
  said memory subsystem further storing a second vehicle speed/stopping distance table;
  if said windshield wiper sensor indicates that said windshield wiper is deactivated, said processor subsystem determining whether to activate said vehicle proximity alarm circuit based upon data received from said radar detector, said road speed sensor and said first vehicle speed/stopping distance table stored in said memory subsystem;
  if said windshield wiper sensor indicates that said windshield wiper is activated, said processor subsystem determining whether to activate said vehicle proximity alarm circuit based upon data received from said radar detector, said road speed sensor and said second vehicle speed/stopping distance table stored in said memory subsystem.

68. Apparatus for optimizing operation of a vehicle according to claim 60, further comprising:
  a display;
  wherein the vehicle proximity alarm includes at least one of an audible and a visual indication; and
  wherein the visual indication is displayed on the display.

69. Apparatus for optimizing operation of a vehicle, comprising:
  a tachometer;
  a radar detector, said radar detector determining a distance separating a vehicle having an engine and an object in front of said vehicle;
  a plurality of sensors coupled to said vehicle for monitoring operation thereof, said plurality of sensors including a road speed sensor, an engine speed sensor and a brake sensor;
  a processor subsystem, coupled to said radar detector and said at least one sensor, to receive data therefrom;
  a memory subsystem including random access memory, coupled to said processor subsystem, said memory subsystem storing a first vehicle speed/stopping distance table;

a vehicle proximity alarm circuit coupled to said processor subsystem, said vehicle proximity alarm circuit issuing an alarm that said vehicle is too close to said object;

said processor subsystem determining whether to activate said vehicle proximity alarm circuit based upon separation distance data received from said radar detector, vehicle speed data received from said road speed sensor and said first vehicle speed/stopping distance table stored in said memory subsystem;

a throttle controller for controlling a throttle of said engine of said vehicle;

wherein said processor subsystem selectively reduces said throttle based upon the data received from said radar detector;

further wherein the processor subsystem includes (i) an active mode in which the processor subsystem activates the vehicle proximity alarm circuit to issue the vehicle proximity alarm and reduces the throttle based upon the data received from said radar detector, and (ii) an inactive mode in which the processor subsystem activates the vehicle proximity alarm circuit to issue the alarm and the throttle is not selectively reduced based upon the data received from said radar detector;

a fuel overinjection notification circuit coupled to said processor subsystem, said fuel overinjection notification circuit issuing a notification that excessive fuel is being supplied to said engine of said vehicle;

an upshift notification circuit coupled to said processor subsystem.

70. Apparatus for optimizing operation of a vehicle according to claim 69, further comprising a mode select line for switching between said active mode and said inactive mode.

71. Apparatus for optimizing operation of a vehicle according to claim 70, further comprising:
a display;
wherein the vehicle proximity alarm includes at least one of an audible and a visual indication; and
wherein the visual indication is displayed on the display.

72. Apparatus for optimizing operation of a vehicle according to claim 71, further comprising a selector for selecting a type of vehicle proximity alarm, wherein the type of vehicle proximity alarm is selected from the group consisting of an audible indication, a visual indication, and combinations thereof.

73. Apparatus for optimizing operation of a vehicle according to claim 72, wherein said memory subsystem stores vehicle class information.

74. Apparatus for optimizing operation of a vehicle according to claim 72, wherein said processor subsystem is configured to select a type of vehicle proximity alarm based on the determined distance, wherein the type of vehicle proximity alarm is selected from the group consisting of an audible indication, a visual indication, and combinations thereof.

75. Apparatus for optimizing operation of a vehicle according to claim 69, wherein said processor subsystem tracks the number of vehicle proximity alarms issued before corrective action eliminates a hazardous condition.

76. Apparatus for optimizing operation of a vehicle, comprising:
a radar detector, said radar detector determining a distance separating a vehicle having an engine and an object in front of said vehicle;
a plurality of sensors coupled to said vehicle for monitoring operation thereof, said plurality of sensors including a road speed sensor, an engine speed sensor and a brake sensor;
a processor subsystem, coupled to said radar detector and said at least one sensor, to receive data therefrom;
a memory subsystem, coupled to said processor subsystem, said memory subsystem storing a first vehicle speed/stopping distance table and an RPM set point;
a vehicle proximity alarm circuit coupled to said processor subsystem, said vehicle proximity alarm circuit issuing an alarm that said vehicle is too close to said object;
said processor subsystem determining whether to activate said vehicle proximity alarm circuit based upon separation distance data received from said radar detector, vehicle speed data received from said road speed sensor and said first vehicle speed/stopping distance table stored in said memory subsystem;
a throttle controller for controlling a throttle of said engine of said vehicle;
wherein said processor subsystem selectively reduces said throttle based upon the data received from said radar detector;
further wherein the processor subsystem includes (i) an active mode in which the processor subsystem activates the vehicle proximity alarm circuit to issue the vehicle proximity alarm and reduces the throttle based upon the data received from said radar detector, and (ii) an inactive mode in which the processor subsystem activates the vehicle proximity alarm circuit to issue the alarm and the throttle is not selectively reduced based upon the data received from said radar detector;
a fuel overinjection notification circuit coupled to said processor subsystem, said fuel overinjection notification circuit issuing a notification that excessive fuel is being supplied to said engine of said vehicle;
further wherein said processor subsystem determines whether a brake of the vehicle is activated based upon data received from the brake sensor.

77. Apparatus for optimizing operation of a vehicle according to claim 76, further comprising a mode select line for switching between said active mode and said inactive mode.

78. Apparatus for optimizing operation of a vehicle according to claim 77, further comprising an upshift notification circuit coupled to said processor subsystem, said upshift notification circuit issuing a notification that said engine of said vehicle is being operated at an excessive speed.

79. Apparatus for optimizing operation of a vehicle according to claim 78, further comprising a downshift notification circuit coupled to said processor subsystem, said downshift notification circuit issuing a notification that said engine of said vehicle is being operated at an insufficient engine speed.

80. Apparatus for optimizing operation of a vehicle according to claim 77, further comprising a selector for selecting a type of vehicle proximity alarm, wherein the type of vehicle proximity alarm is selected from the group consisting of an audible indication, a visual indication, and combinations thereof.

81. Apparatus for optimizing operation of a vehicle according to claim 77, further comprising a bus for bidirectional exchanges of address, data and control signals between said processor subsystem and said memory subsystem.

82. Apparatus for optimizing operation of a vehicle according to claim 81, wherein said memory subsystem includes at least one register for holding the level of said road speed sensor.

83. Apparatus for optimizing operation of a vehicle according to claim 77, further comprising a speedometer.

84. Apparatus for optimizing operation of a vehicle according to claim 77, further comprising a power source including voltage divider circuitry.

85. Apparatus for optimizing operation of a vehicle according to claim 77, wherein said processor subsystem is configured to retrieve data from said road speed sensor and store the data in said memory subsystem.

86. Apparatus for optimizing operation of a vehicle according to claim 77, wherein said processor subsystem is configured to wait a preselected time period after issuing the vehicle proximity alarm.

87. Apparatus for optimizing operation of a vehicle according to claim 77, wherein said processor subsystem is configured to select a type of vehicle proximity alarm based on the determined distance, wherein the type of vehicle proximity alarm is selected from the group consisting of an audible indication, a visual indication, and combinations thereof.

88. Apparatus for optimizing operation of a vehicle according to claim 76, further comprising:
an upshift notification circuit coupled to said processor subsystem, said upshift notification circuit issuing a notification that said engine of said vehicle is being operated at an excessive speed; and
said processor subsystem determining, based upon whether engine speed exceeds said RPM set point, when to activate said upshift notification circuit.

89. Apparatus for optimizing operation of a vehicle according to claim 76, further comprising a selector for selecting a type of vehicle proximity alarm, wherein the type of vehicle proximity alarm is selected from the group consisting of an audible indication, a visual indication, and combinations thereof.

* * * * *

(12) INTER PARTES REVIEW CERTIFICATE (133rd)
United States Patent
Slepian et al.

(10) Number: US 5,954,781 K1
(45) Certificate Issued: May 13, 2016

(54) METHOD AND APPARATUS FOR OPTIMIZING VEHICLE OPERATION

(75) Inventors: Harvey Slepian; Loran Sutton

(73) Assignee: VELOCITY PATENT LLC

Trial Number:

IPR2014-01247 filed Aug. 4, 2014

Petitioners: Mercedes-Benz USA, LLC; Mercedes-Benz U.S. International, Inc.

Patent Owner: Velocity Patent, LCC

Inter Partes Review Certificate for:

Patent No.: 5,954,781
Issued: Sep. 21, 1999
Appl. No.: 08/813,270
Filed: Mar. 10, 1997

The results of IPR2014-01247 are reflected in this inter partes review certificate under 35 U.S.C. 318(b).

INTER PARTES REVIEW CERTIFICATE
U.S. Patent 5,954,781 K1
Trial No. IPR2014-01247
Certificate Issued May 13, 2016

AS A RESULT OF THE INTER PARTES REVIEW PROCEEDING, IT HAS BEEN DETERMINED THAT:

Claims 31 and 32 are disclaimed.

\* \* \* \* \*